Nov. 18, 1941.  B. R. BENJAMIN  2,262,880
PLANTER
Filed Jan. 31, 1940
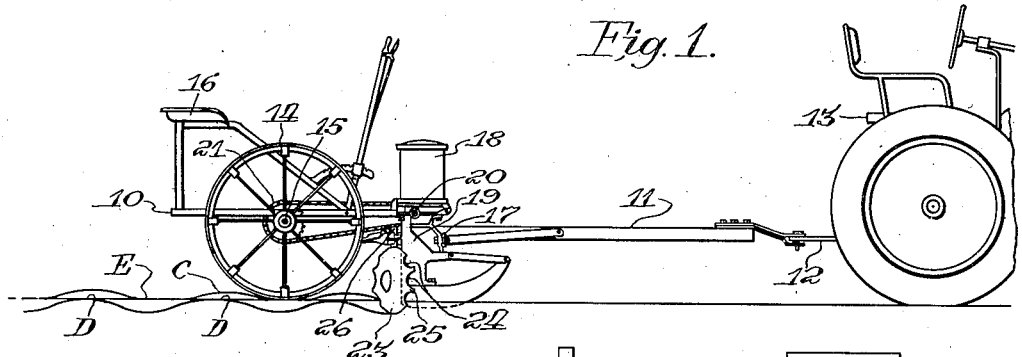
Fig. 1.
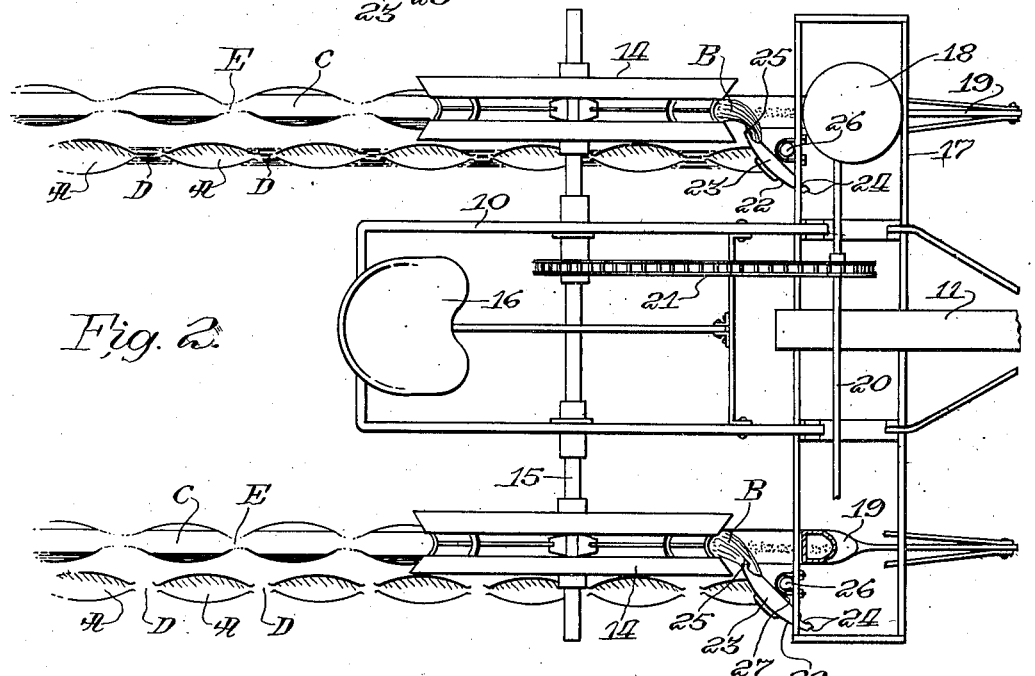
Fig. 2.
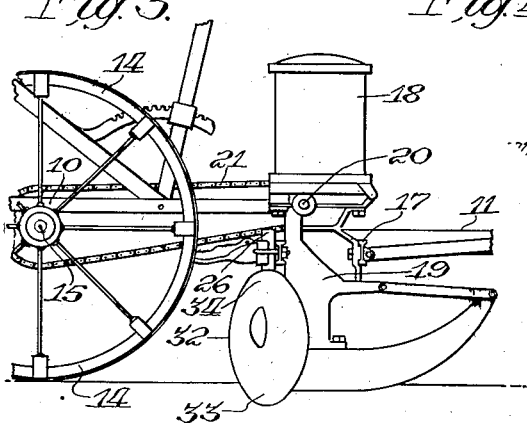
Fig. 3.
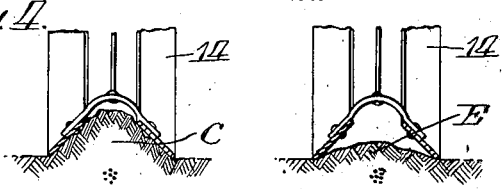
Fig. 4.
Fig. 5.
Inventor
Bert R. Benjamin
By Paul O. Pippel
Atty Patented Nov. 18, 1941

2,262,880

UNITED STATES PATENT OFFICE 2,262,880

PLANTER

Bert R. Benjamin, Oak Park, Ill., assignor to International Harvester Company, a corporation of New Jersey Application January 31, 1940, Serial No. 316,457

8 Claims. (Cl. 111—15)

This invention relates to a planter construction, and more particularly to an improved covering means for covering the seed as it is planted or delivered by the seed delivery means of the planter.

The invention contemplates and has for its principal object the provision of an improved covering means which covers the seed with soil of varying quantities, whereby the seed is planted at varying depths relative to the ultimate soil surface or level.

An important object is to provide the covering means in such form as to form basins closely adjacent the sides of the line of planting, the soil used for covering being taken from these basins.

Another object of the invention is to provide the covering and basin-forming means in the form of a rotatable element having soil-engaging elements of different sizes for successively engaging varying amounts of soil so that said varying amounts of soil are deposited on top of the planted seed to provide the aforesaid hills or mounds.

Briefly and specifically, these and other important objects are achieved in one preferred form of the invention by the provision, in a planter having a frame and seed-delivery means, of a covering element in the form of a notched disk having uncut portions of a considerable size whereby the uncut portions will engage larger quantities of soil and the notched portions will engage smaller quantities of soil to throw said soil behind the delivery means to cover the seed in mounds or hills of varying heights.

A more complete understanding of the objects and desirable features of the invention may be had from the following detailed description taken in conjunction with the accompanying sheet of drawings, wherein:

Figure 1 is a side elevational view of a planter embodying the invention;

Figure 2 is a plan view of the same;

Figure 3 is an enlarged side elevational view of a planter having a modified form of covering element; and, Figures 4 and 5, respectively, are illustrations of larger and smaller hills or mounds as formed by the covering device.

The particular type of planter construction chosen for the purpose of illustration is illustrated in Figures 1 and 2 as comprising a suitable frame 10 connected to a forwardly extending draft element 11. The draft element is connected at its forward end to the draw-bar 12 of a draft vehicle generally represented by the numeral 13. The planter includes the usual laterally spaced press-wheels 14 carried on an axle 15 journaled on the frame 10. A suitable operator's station 16 is disposed on the frame. The forward portion of the frame 15 carries a transversely disposed secondary frame 17 which supports a pair of seeding mechanisms respectively in alinement with the press-wheels 14. Each seeding mechanism consists generally of a seed can 18 and a seed delivery member 19 in the form of the usual shoe or runner. The planter illustrated is of the two-row type and is preferably operated without the usual checking means common to planters of the check-row type. For the purpose of releasing seed from the cans 18 and, through the delivery members 19, the secondary frame 17 includes a transverse rotatable shaft 20 driven by a drive chain 21 from the axle 15. This means for delivering the seed may be any suitable means.

The planter construction described in the foregoing paragraph is of substantially conventional construction and the details thereof are well known to those skilled in the art.

The present invention provides covering means for the seed delivered by the delivery members 19. There is one such means provided for each planting unit and each means is preferably in the form of a disk 22 having substantially large portions of its periphery in arcuate form, as at 23, and other portions of its periphery cut out or notched to provide a plurality of notches 24 respectively separated by a plurality of radially extending smaller tooth portions or fingers 25. Each disk 22 is carried for rotation on an axis disposed at an angle to the path of movement of the planter. The support for each disk preferably comprises a vertical standard 26 rigidly carried by a rearward member of the secondary planter frame 17. The lower end of the standard includes a laterally and rearwardly extending stub axle portion 27 on which the disk 22 is journaled. As best shown in Figure 2, each disk is arranged rearwardly of the seeding mechanism and forwardly of the respective press-wheel 14. The function of the disk in this position will be presently described.

In the modified form of construction shown in Figure 3 the covering element takes the form of a disk 32 journaled on the support 26 at a point spaced radially from the true center of the disk, to provide and eccentric mounting. This disk 32 has generally diametrically opposite portions thereof spaced at different distances from its mounting axis, thus providing a larger soil-engaging portion 33 and a smaller soil-engaging portion 34. The function and operation of the two forms of disks will presently appear.

As the planter moves forwardly over the field, the disks 22 are rotated and successively engage the soil with the larger and smaller portions 23 and 25. The larger portions 23 consequently cut larger amounts from the soil to form a plurality of pockets or basins at A, closely adjacent the line of planting. The quantity of soil cut by the disk portions 23 in forming these basins is thrown laterally over the planted seed, rearwardly of the seed-delivery member 19 and forwardly of the respective press-wheel 14. This function is best illustrated at B in Figure 2. These larger quantities of soil are thus adapted to cover the seed that has been deposited by the respective seeding mechanisms, and a plurality of hills or mounds of substantial size will be disposed along the line of planting, as generally illustrated at C in Figures 1, 2 and 4.

The smaller tooth or finger portions 25 of the disk 22, as they engage the soil, cut out appreciably smaller quantities of soil, these smaller cuts occurring intermittently between the basins A, generally indicated at D in Figures 1 and 2. Consequently, only very small portions of the soil thus cut are thrown laterally across the line of planting and on top of the planted seed, and thus appreciably smaller hills or mounds are formed at intervals between the larger hills or mounds C, as formed by the disk portion 23. A smaller hill or mound is generally indicated at E in Figures 1, 2 and 5.

In the foregoing manner the deposited or planted seed is covered by successively larger and smaller amounts of soil; or, as otherwise stated, the seed is deposited and covered at varying depths relative to the ultimate soil surface or ground level.

The particular function of the modified disk 32 and the types of pockets or basins and hills or mounds formed thereby will be obvious from the foregoing description of the operation and function of the disk 22.

The results obtainable by the construction provided by the present invention are especially desirable in localities where the moisture conditions are not of the best. The pockets or basins A aid in the conservation of whatever moisture is precipitated and this moisture is retained at the sides of the line of planting in such a manner as not to wash away or rot the deposited seed. The result obtained by the covering of the deposited seed in a succession of hills or mounds of varying heights accommodates both extremely dry or extremely wet conditions. The slight seed coverage obtained in the formation of the smaller hills or mounds E is desirable in enabling the seed covered thereby to obtain sufficient moisture for initial growth. The heavier coverage obtained in the larger or higher hills or mounds C protects the seed covered thereby from the usual attack of heavy moisture deposits. Under ordinary conditions the seed will mature into growing crops regardless of the manner in which it was initially covered. The special provision is made by the construction embodied in the present invention for the purposes of accommodating the growth of crops under adverse conditions.

As previously set forth, only a preferred form of the invention has been illustrated and described for the purpose of designating in a preferred form of the invention the function and operation thereof and the results obtainable thereby. It will be appreciated, of course, that numerous modifications and alterations may be made in this construction without departing from the spirit and scope of the invention as defined in the appended claims.

What is claimed is:

1. In a planter having a frame and a seeding means including a seed delivery member, the combination therewith of a covering element rotatably carried by the frame rearwardly of the delivery member, said element including successively greater and lesser soil-engaging portions engaging the soil and covering the seed rearwardly of the delivery member with successively greater and lesser amounts of soil.

2. In a planter having a frame and seeding means including a seed delivery member, the combination therewith of a covering element comprising generally a disk carried for rotation on the frame rearwardly of the delivery member on an axis inclined to the direction of travel of the planter, said disk being cut out to form peripheral notches with small portions therebetween and leaving larger uncut portions remaining, said larger and smaller portions engaging the soil during rotation of the disk and throwing respectively larger and smaller quantities of soil behind the delivery member to cover the seed in hills of varying heights.

3. In a planter having seed delivery means adapted to plant seed at a considerable depth, the combination therewith of covering means associated therewith and comprising a rotatable member operated by forward movement of the planter, said member being engageable with and cutting the soil at varying depths to throw soil rearwardly of the delivery means for covering the seed with varying amounts of soil.

4. In a planter having a frame and seeding means including a seed delivery member, the combination therewith of a covering element comprising generally a disk having diametrically opposite, large soil-engaging portions and other diametrically opposite, smaller soil-engaging portions, said portions successively engaging the soil and throwing respectively larger and smaller quantities of soil rearwardly of the delivery member to cover the seed with soil in varying amounts.

5. In a planter having a frame and seeding means including a seed delivery member, the combination therewith of a covering element comprising generally a disk having a portion of its peripheral edge cut away at intervals and having another peripheral portion formed continuous, said portions successively engaging the soil and throwing respectively smaller and larger portions of soil rearwardly of the delivery member to cover the seed with varying amounts of soil.

6. In a planter having a frame, seeding means including a seed-delivery member, and a press-wheel spaced rearwardly of the delivery member, the combination with the seeding means of a covering element rotatably carried by the frame rearwardly of the delivery member and forwardly of the press-wheel, said element including successively greater and lesser soil-engaging portions engaging the soil and covering the seed rearwardly of the delivery member and forwardly of the press-wheel with successively greater and lesser amounts of soil.

7. In a planter having seed-delivery means adapted to plant seed at a considerable depth, the combination therewith of rotatable means operated by forward movement of the planter and engaging the soil and directing varying amounts of soil rearwardly of the delivery means for covering the seed with soil deposits of different amounts.

8. In a planter having a frame and seed-delivery means adapted to plant seed at a considerable depth, the combination therewith of means carried by the frame and cooperating with the delivery means for disposing delivered seed at varying depths with respect to the ultimate ground level, said last named means including a rotatable element engaging the soil and directing varying amounts of soil on top of delivered seed.

BERT R. BENJAMIN.